United States Patent
Reed et al.

(10) Patent No.: US 12,155,197 B2
(45) Date of Patent: Nov. 26, 2024

(54) ISOLATION APPARATUS AND METHOD OF A FAULT SEGMENT IN A TRANSFORMER LOOP

(71) Applicant: Eaton Intelligent Power Limited, Dublin (IE)

(72) Inventors: Samuel T. Reed, Washington Island, WI (US); Steven Howard Buehler, Waukesha, WI (US); Eduardo Muñoz Sampedro, Greenfield, WI (US)

(73) Assignee: Eaton Intelligent Power Limited, Dublin (IE)

( * ) Notice: Subject to any disclaimer, the term of this patent is extended or adjusted under 35 U.S.C. 154(b) by 244 days.

(21) Appl. No.: 17/545,129

(22) Filed: Dec. 8, 2021

(65) Prior Publication Data
US 2022/0223338 A1    Jul. 14, 2022

Related U.S. Application Data

(60) Provisional application No. 63/135,255, filed on Jan. 8, 2021.

(51) Int. Cl.
*H02H 7/04* (2006.01)
*H02J 3/38* (2006.01)

(52) U.S. Cl.
CPC . *H02H 7/04* (2013.01); *H02J 3/38* (2013.01)

(58) Field of Classification Search
CPC ..................................... H02H 7/04; H02J 3/38
USPC ...................................................... 361/35, 67
See application file for complete search history.

(56) References Cited

U.S. PATENT DOCUMENTS

| 3,210,750 | A | 10/1965 | Leonard |
| 5,973,899 | A * | 10/1999 | Williams ............... H02H 3/063 361/72 |
| 7,154,722 | B1 | 12/2006 | Stoupis et al. |
| 7,751,166 | B2 * | 7/2010 | Stoupis ............. H02J 13/00006 361/64 |
| 2011/0046809 | A1 * | 2/2011 | Fickey .................. H02H 5/005 702/3 |

(Continued)

FOREIGN PATENT DOCUMENTS

| DE | 102011075353 A1 | 11/2012 |
| WO | 2017196224 A1 | 11/2017 |

OTHER PUBLICATIONS

Ingrid Kardinal, European International Searching Authority, International Search Report and Written Opinion, counterpart PCT Application No. PCT/EP2022/025009, mailed May 12, 2022, 23 pages total.

(Continued)

*Primary Examiner* — Alex Torres-Rivera
(74) *Attorney, Agent, or Firm* — DiBerardino McGovern IP Group LLC

(57) ABSTRACT

A transformer assembly includes: a first switching apparatus configured to be electrically connected to a first segment of a transformer loop; a second switching apparatus configured to be electrically connected to a second segment of the transformer loop; and a transformer including: a first coil electrically connected to the first switching apparatus and the second switching apparatus; and a second coil electrically connected to an output configured to electrically connect to a load.

20 Claims, 6 Drawing Sheets

(56) References Cited

U.S. PATENT DOCUMENTS

2013/0175879 A1* 7/2013 Taylor .................... H02H 9/002
  307/125
2019/0377021 A1* 12/2019 Bhalwankar ......... G01R 15/202
2022/0102974 A1* 3/2022 Seng ................ H02J 13/00016

OTHER PUBLICATIONS

Distribution/Substation or Padmount Transformer Functional Specification Guide Type AR-VFI, Arc-Reduction Vacuum Fault Interrupter Transformer, PS202013EN, Cooper Power Series, Eaton Corp., Apr. 2019.

* cited by examiner

ISOLATION APPARATUS AND METHOD OF A FAULT SEGMENT IN A TRANSFORMER LOOP

CROSS-REFERENCE TO RELATED APPLICATION

This application claims the benefit of U.S. Provisional Application No. 63/135,255, filed on Jan. 8, 2021 and titled TRANSFORMER APPARATUS, which is incorporated herein by reference in its entirety.

TECHNICAL FIELD

This disclosure relates to a transformer apparatus for use in, for example, a medium-voltage or high-voltage electrical power distribution network.

BACKGROUND

A voltage transformer includes a first coil and a second coil that are coupled by a magnetic core. The voltage transformer may reduce the voltage at the input of the transformer so that the output of the transformer is suitable for a load.

SUMMARY

In one aspect, an assembly includes: a first switching apparatus configured to be electrically connected to a first segment of a transformer loop; a second switching apparatus configured to be electrically connected to a second segment of the transformer loop; and a transformer including: a first coil electrically connected to the first switching apparatus and the second switching apparatus; and a second coil electrically connected to an output that is configured to electrically connect to a load.

Implementations may include one or more of the following features. The assembly also may include an electronic control system configured to control a state of the first switching apparatus and a state of the second switching apparatus. The electronic control system may be further configured to: issue a command to a second electronic control system in a second assembly, where the command is sufficient to cause the second electronic control to change a state of a switching apparatus in the second assembly; and to receive a command from the second electronic control system, where the received command is sufficient to cause the electronic control to change a state of the first switching apparatus or the second switching apparatus. The electronic control system may be further configured to control any switching apparatus that is electrically connected to any segment of the transformer loop. The electronic control system may be further configured to communicate with a remote device that is separate from the assembly.

In some implementations, the assembly also includes a sensor system configured to sense electrical current in the first segment and electrical current in the second segment. The sensor system may include: a first current transformer configured to sense current flowing to the first switching apparatus; and a second current transformer configured to sense current flowing to the second switching apparatus. The assembly also may include an electronic control system that stores threshold current values and is coupled to the first switching apparatus, the second switching apparatus, and the sensor system; and the electronic control system may be configured to: open the first switching apparatus if the current flowing to the first switching apparatus exceeds the threshold; and to open the second switching apparatus if the current flowing to the second switching apparatus exceeds the threshold.

In some implementations, the assembly also includes a housing; and a tank inside the housing, and the electronic control includes an interface that is accessible from an exterior of the housing; and the tank encloses the first switching apparatus, the second switching apparatus, and the transformer. The tank may be at least partially filled with an insulating fluid.

The assembly may be a multi-phase transformer assembly configured for use with an N-phase electrical distribution system, and, in these implementations, N is an integer number greater than 1, the first switching apparatus is a gang-operated switching apparatus that includes N switches, and the second switching apparatus is a gang-operated switching apparatus that includes N switches.

In another aspect, a system includes a transformer loop configured to be electrically connected to a first electrical source and to a second electrical source; a first transformer assembly including: a first switching apparatus electrically connected to a first segment of the transformer loop; a second switching apparatus electrically connected to a second segment of the transformer loop; a first voltage transformer electrically connected to the first switching apparatus and to the second switching apparatus, where the first voltage transformer is further electrically connected to a first load; and a first electronic control system. The system also includes a second transformer assembly including: a third switching apparatus electrically connected to the second segment of the transformer loop; a fourth switching apparatus electrically connected to a third segment of the transformer loop; a second voltage transformer electrically connected to the third switching apparatus and to the fourth switching apparatus, where the second voltage transformer is further electrically connected to a second load; and a second electronic control system.

Implementations may include one or more of the following features. The first electronic control system may be coupled to the first switching apparatus and the second switching apparatus; the second electronic control system may be coupled to the third switching apparatus, and the fourth switching apparatus; and the first electronic control system and the second electronic control may be configured to communicate with each other. The first electronic control and the second electronic control also may be further configured to communicate with a remote station that is separate from the first transformer assembly and the second transformer assembly.

In another aspect, an electronic control system for a transformer assembly includes: a communications interface; an electronic processing module; and an electronic storage coupled to the electronic processing module, the electronic storage including instructions that, when executed, cause the electronic processing module to: process a command received from an external device, the command including information that identifies one of two switching apparatuses in a feed of the transformer assembly to transition from a first state to a second state; generate a command for an actuation apparatus associated with the identified one of the two switching apparatuses; and provide the command to the actuation apparatus to thereby change the state of the identified one of the two switching apparatuses and to thereby connect or disconnect the identified one of the two switching apparatuses from a transformer loop.

Implementations may include one or more of the following features. The external device may include a separate and distinct transformer assembly, and the instructions may cause the electronic processing module to process a command received from the separate and distinct transformer assembly. The electronic storage also may include instructions that, when executed, cause the electronic processing module to generate a command and provide the command to a communications interface of a separate and distinct transformer assembly.

In another aspect, a method of changing a transformer loop from a first source configuration to a second source configuration includes: identifying a first transformer assembly from among a plurality of transformer assemblies in the transformer loop, the first transformer assembly including a switching apparatus that is normally open in a first source configuration; identifying a second transformer assembly from among the plurality of transformer assemblies in the transformer loop, the second transformer assembly including a switching apparatus that is normally open in a second source configuration; commanding an electronic control system in the second transformer assembly to open the switching apparatus that is normally open in the second source configuration; and after the switching apparatus that is normally open in the second source configuration is open, commanding an electronic control system in the first transformer assembly to close the switching apparatus that is normally open in the first source configuration such that the source configuration is changed from the first source configuration to the second source configuration.

Implementations may include one or more of the following features. The first transformer assembly and the second transformer assembly may be different ones of the plurality of transformer assemblies.

In another aspect, a method of isolating a faulted transformer loop segment includes: receiving an indication of a current flowing to a first switching apparatus and a second switching apparatus of a first transformer assembly, where the first switching apparatus is electrically connected to a first segment of the transformer loop and the second switching apparatus is electrically connected to a second segment of the transformer loop; comparing the indication to a fault current threshold to determine whether the current flowing to the first switching apparatus or the second switching apparatus exceeds the fault current threshold; if the current flowing to the first switching apparatus exceeds the fault current threshold, commanding a motion control device associated with the first switching apparatus such that the first switching apparatus opens; and isolating the first segment of the transformer loop by commanding an electronic control system in a second transformer assembly to open a third switching apparatus, where the third switching apparatus is electrically connected to the first segment of the transformer loop and is in the second transformer assembly.

In some implementations, the method of isolating a faulted transformer loop segment also includes controlling an electronic control system in a third transformer assembly to close a fourth switching apparatus, the fourth switching apparatus being configured to be normally open prior to being closed.

Implementations of any of the techniques described herein may include an apparatus, a transformer assembly, a method, a system, a control system, or instructions stored on a computer-readable medium. The details of one or more implementations are set forth in the accompanying drawings and the description below. Other features will be apparent from the description and drawings, and from the claims.

DRAWING DESCRIPTION

DETAILED DESCRIPTION

Figure 1B:
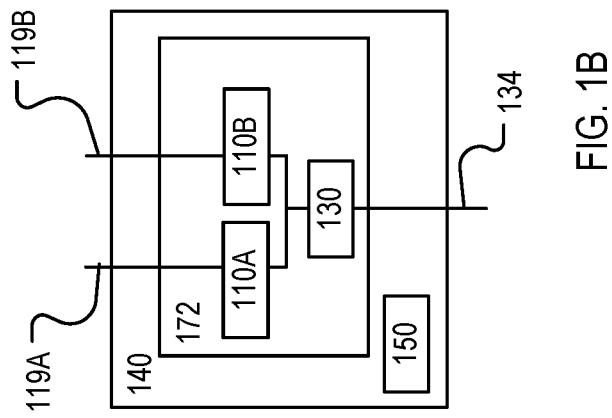
FIG. 1B is a block diagram of an example of an electrical circuit for the transformer apparatus of FIG. 1A.
Figure 1A:
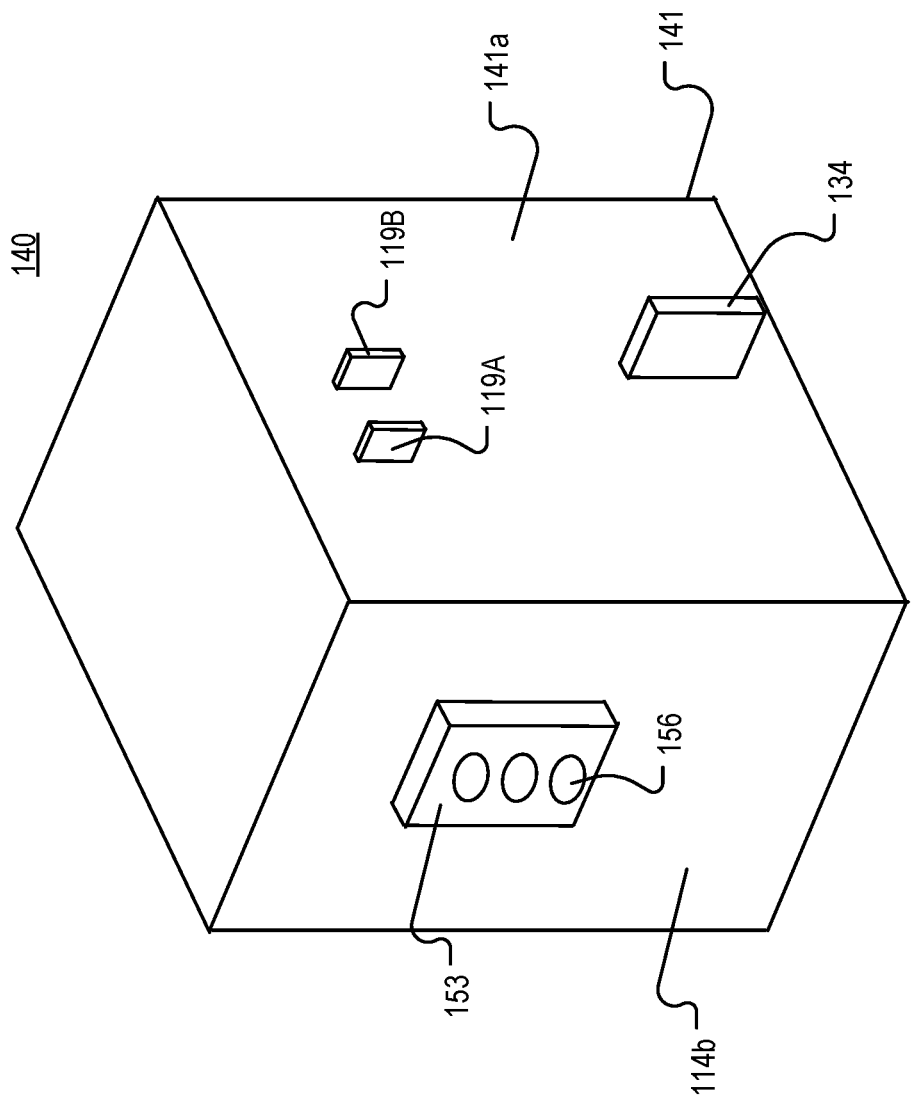
FIG. 1A is a perspective view of an example of a transformer apparatus.
Figure 3:
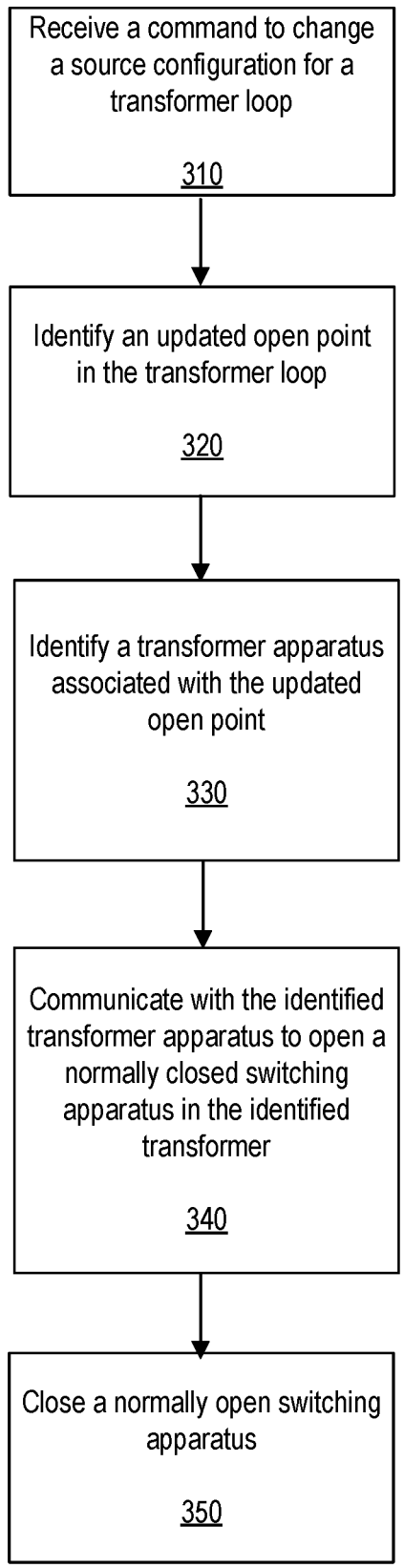
FIG. 3 is a flow chart of an example of a process for transferring between two sources in a transformer loop.
Figure 4:
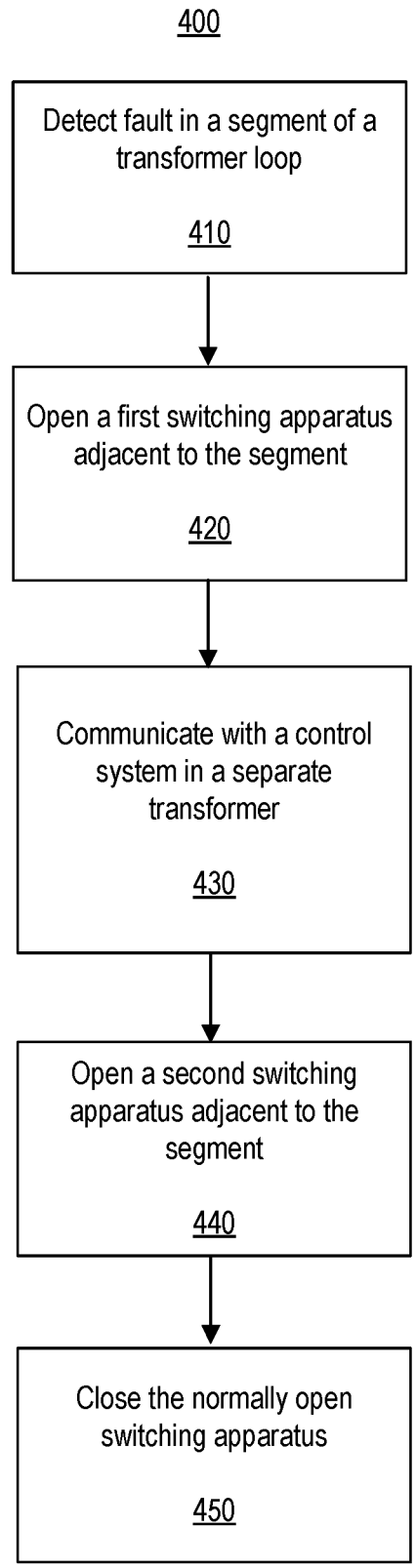
FIG. 4 is a flow chart of an example of a process for isolating a faulted segment of a transformer loop.

FIG. 1A is a perspective exterior view of a transformer apparatus (or transformer assembly) 140. The transformer apparatus 140 may be used in medium-voltage (for example, 15 to 35 kiloVolts (kV)) and high-voltage (for example, greater than 45 kV) applications. The transformer apparatus 140 includes a housing 141. FIG. 1B is a block diagram of an electrical circuit 172 that is inside the housing 141. The transformer apparatus 140 also includes a control system 150. The configuration of the control system 150 allows the transformer apparatus 140 be used alone or with other similarly configured transformer apparatuses to perform automatic source transfer and automatic isolation of line-side segments. FIGS. 3 and 4 provide examples of processes for automatic source transfer and automatic line-side segment isolation, respectively. Moreover, the transformer apparatus 140 includes the control system 150 and the circuit 172 are in a single piece of equipment.

The electrical circuit 172 includes a first switching apparatus 110A, a second switching apparatus 110B, and a transformer 130. The switching apparatuses 110A and 110B are any type of switching apparatus suitable for the voltages and currents at which the transformer apparatus 140 operates, and the switching apparatuses 110A and 110B are any type of trippable and/or openable device that utilizes a mechanical and/or electronic mechanism to separate current-carrying electrical contacts for the purpose of interrupting the flow of electricity. The switching apparatus 110A and 110B have a closed state in which current flows through switching apparatus and an open state in which current cannot flow through the switching apparatus. The switching apparatuses 110A and 110B may be, for example, vacuum fault interrupters, circuit breakers, circuit switchers, load-break switches, vacuum breakers, vacuum switches, gas-insulated breakers, contactors, reclosers, or any electronically trippable switching and/or interrupting device. Examples of gas-insulated breakers include, but are not limited to, sulfur hexafluoride ($SF_6$) insulated breakers and air-insulated breakers. Moreover, single-phase devices, multi-phase gang-operated devices, or a combination of single-phase and multi-phase devices may be used as the switching apparatus 110A or 110B. A gang-operated switching apparatus is configured to interrupt or switch more than one phase simultaneously.

The housing 141 is a three-dimensional body that is made of a rugged and durable material. For example, the housing 141 may be made of metal or a ruggedized polymer material. In the example shown in FIG. 1A, the housing 141 is a parallelepiped that includes six walls. Two walls 141a and 141b are labeled in FIG. 1A. The first switching apparatus 110A is electrically connected to a first line-side input 119A. The second switching apparatus 110B is electrically connected to a second line-side input 119B. The first line-side input 119A and the second line-side input 119B are on the high-voltage or medium-voltage side of the transformer apparatus 140. The first line-side input 119A is also referred to as the first feed 119A or the incoming feed 119A. The second line-side input 119B is also referred to the second feed 119B or the outgoing feed 119B. The inputs 119A and 119B are the feed to the transformer apparatus 140. The feed of the transformer apparatus 140 includes two switching apparatuses (the switching apparatuses 210A and 210B).

A single phase is shown in FIGS. 1A and 1B. However, the transformer apparatus 140 may be implemented as a multi-phase device that includes an instance of the circuit 172 for each phase. For example, each phase of the transformer apparatus 140 may include two single-phase switching apparatuses and a transformer connected as shown in FIG. 1B. In these implementations, a three-phase transformer apparatus may include three single-phase switching apparatuses on the first line-side input 119A and three single-phase switching apparatuses on the second line-side input 119B, with each phase including one of the single-phase switching apparatuses the input 119A and one of the single-phase switching apparatus on the input 119B. In another example of a three-phase implementation, each switching apparatus 110A and 110B is a gang-operated three-phase switching apparatus. In these implementations, the switching apparatus 110A includes three gang-operated switches on the incoming feed 119A and the switching apparatus 110B includes three gang-operated switches on the outgoing feed 119B.

The line-side inputs 119A and 119B extend through the wall 141a of the housing 141 and are accessible from the exterior of the housing 141. The line-side inputs 119A and 119B are made of an electrically conductive material such as, for example, copper, brass, silver, and/or another metal. The transformer 130 is electrically connected to a load-side output 134. The load-side output 134 also passes through the wall 141a of the housing 141 and is made of an electrically conductive material.

In operational use, the line-side inputs 119A and 119B are electrically connected to an electrical distribution system or a transformer loop that provides alternating current (AC) electrical power to the transformer apparatus 140, and the load-side output 134 is electrically connected to a load that consumes electricity, transfers electricity, or otherwise uses electrical energy.

The transformer apparatus 140 also includes the control system 150. The control system 150 is coupled to the circuit 172 and controls the components of the circuit 172. For example, the control system 150 is configured to control a state of the switching apparatuses 110A and 110B. The control system 150 includes an interface 153 that is accessible from the exterior of the housing 141. The interface 153 includes a data interface or data connection 156 that allows the control system 150 to communicate with a remote device. For example, the control system 150 may communicate with another transformer apparatus and/or with a remote monitoring station through the data connection 156. Furthermore, the interface 153 may include controls (for example, a keypad or transceiver that accepts input from a remote control) that allow an operator of the transformer apparatus 140 to control the various components of the circuit 172 or another transformer apparatus without accessing the interior of the housing 141 or the interior of the other transformer apparatus.

The housing 141 may have other shapes, and the configuration and arrangement of the line-side inputs 119A and 119B, the interface 153, the interface 156, and the load-side output 134 may be other than shown in the example of FIG. 1A.

Figure 2A:
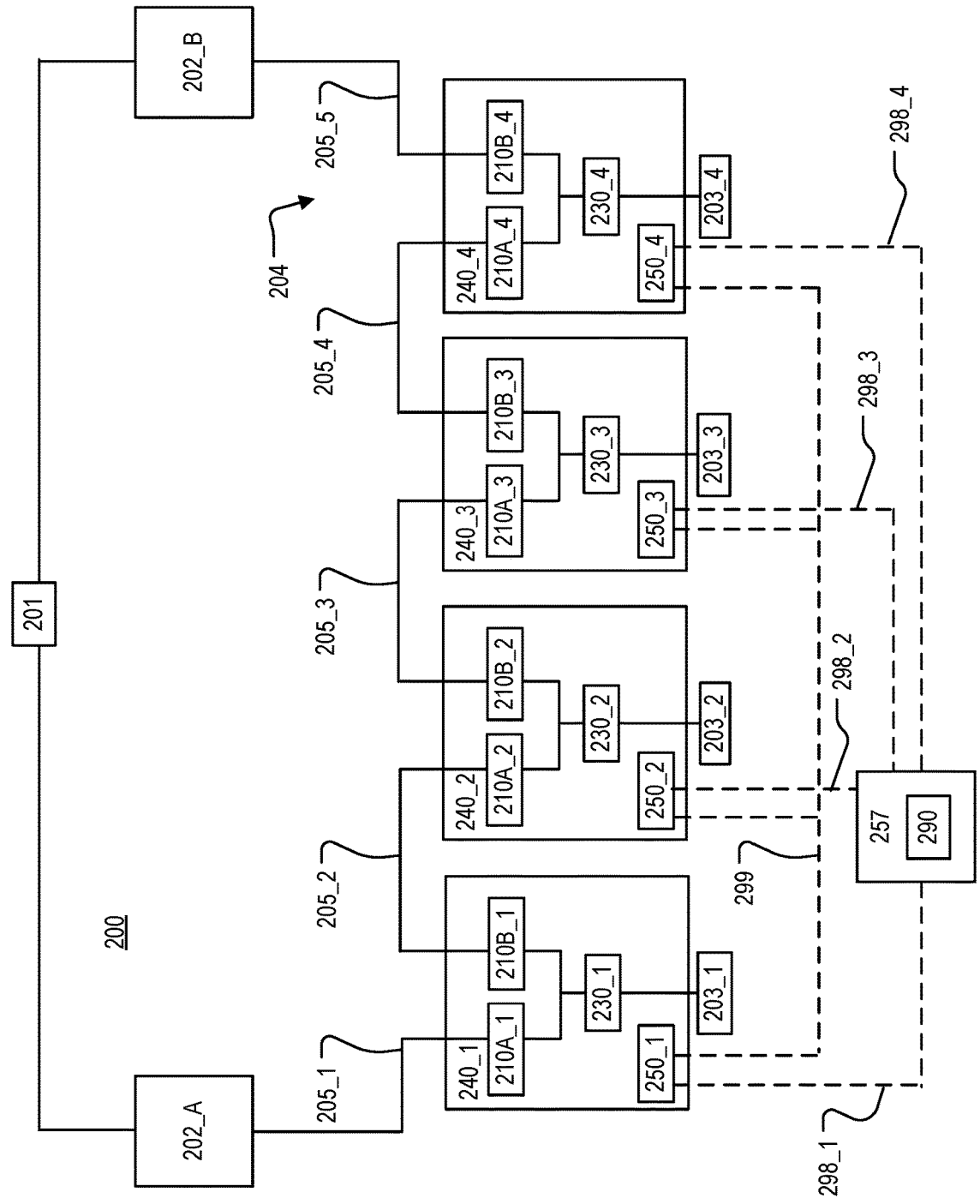
FIG. 2A is a block diagram of an example of a system that includes a plurality of transformer apparatuses electrically connected to a transformer loop.

FIG. 2A is a block diagram of a system 200. The system 200 includes transformer apparatuses 240_1, 240_2, 240_3, and 240_4 that are electrically connected to a transformer loop 204. The transformer loop 204 is also electrically connected to electrical sources 202_A and 202_B, which are part of an alternating current (AC) electrical power distribution system 201. The transformer loop 204 includes a first segment 205_1, a second segment 205_2, a third segment 205_3, a fourth segment 205_4, and a fifth segment 205_5. The configuration of the transformer apparatuses 240_1, 240_2, 240_3, and 240_4 allows automatic isolation of faulted segments and automatic transfer between the source 202_A and the source 202_B.

The power distribution system 201 may be, for example, an electrical grid, a utility system, an electrical system, or a multi-phase electrical network that distributes electrical power to industrial, residential, and/or commercial entities. The power distribution system 201 may be a sub-system of a larger power system. For example, the power distribution system 201 may be a utility substation. The power distribution system 201 may have a system level voltage of, for example, at least 1 kilovolt (kV), 25 kV, 27, kV, 29 kV, between 15 kV and 35 kV, up to 34.5 kV, up to 38 kV, up to 69 kV, or 69 kV or higher and a fundamental frequency of, for example, 50 or 60 Hertz (Hz). The transformer loop 204 is any device that distributes electricity and may include, for example, transmission lines, electrical cables, and/or electrical wires. The transformer loop 204 operates at the system voltage. In other words, if the nominal operating voltage of the power distribution system 201 is 15 kV, the nominal voltage on the transformer loop 204 is also 15 kV.

The transformer apparatus 240_1 includes vacuum fault interrupters 210A_1, 210B_1 and a transformer 230_1. The vacuum fault interrupters 210A_1 and 210B_1 are electrically connected to an input of the transformer 230_1, and the output of the transformer 230_1 is electrically connected to a load 203_1. The transformer 230_1 may be a voltage transformer that reduces the system voltage to an operating voltage that is suitable for the load 203_1. The transformer apparatuses 240_2, 240_3, 240_4 are configured in a similar manner. In the example shown, the transformer apparatus 204_2 includes vacuum fault interrupters 210A_2, 210B_2 and a transformer 230_2, the transformer apparatus 204_3 includes vacuum fault interrupters 210A_3, 210B_3 and a transformer 230_3, and the transformer apparatus 240_4 includes vacuum fault interrupters 210A_4, 210B_4 and a transformer 230_4. The output of each transformer 230_2, 230_3, 230_4 is electrically connected to a respective load 203_2, 203_3, 203_4.

The first segment 205_1 of the transformer loop 204 electrically connects the electrical source 202_A and the vacuum fault interrupter 210A_1. The second segment 205_2 is electrically connected to the vacuum fault interrupter 210B_1 and the vacuum fault interrupter 210A_2. The third segment 205_3 is electrically connected to the vacuum fault interrupter 210B_2 and to the vacuum fault interrupter 210A_3. The fourth segment 205_4 is electrically connected to the vacuum fault interrupter 210B_3 and the vacuum fault interrupter 210A_4. The fifth segment 205_5 is electrically connected to the vacuum fault interrupter 210B_4 and the electrical source 202_B.

Aspects of the transformer apparatus 240_1 are discussed below. The transformer apparatuses 240_2, 240_3, and 240_4 are configured in a similar manner.

Figure 2C:
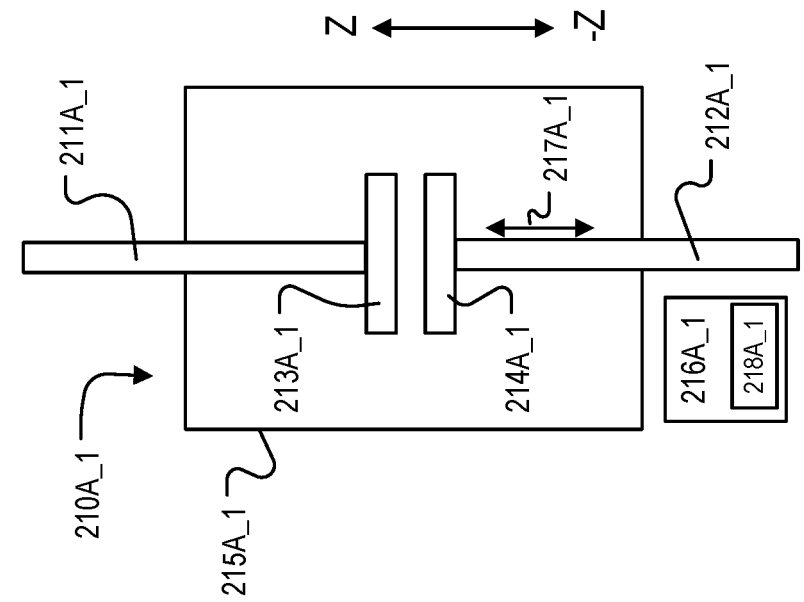
FIG. 2C is a block diagram of an example of a vacuum fault interrupter.
Figure 2B:
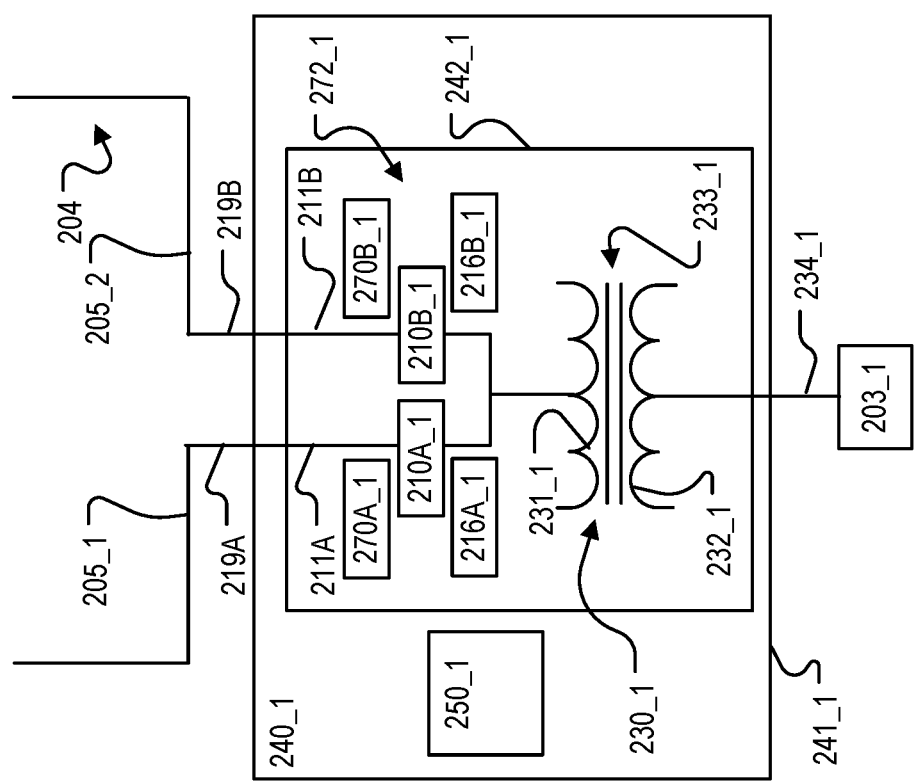
FIG. 2B is a block diagram of an example of electrical components inside one of the transformer apparatuses of FIG. 2A.

FIG. 2B is a block diagram that shows additional details of the transformer apparatus 240_1. The vacuum fault interrupter 210A_1 and the vacuum fault interrupter 210B_1 are electrically connected to a first coil 231_1 of the transformer 230_1. The transformer 230_1 also includes a second coil 232_1 and a magnetic core 233_1 that magnetically couples the first coil 231_1 and the second coil 232_1. The second coil 232_1 is electrically connected to the load 203_1.

FIG. 2C is a side cross-sectional block diagram of the vacuum fault interrupter 210A_1. The vacuum fault interrupter 210A_1 includes a housing 215A_1 that encloses a stationary contact 213A_1 and a movable contact 214A_1 in an evacuated space. The stationary contact 213A_1 is at an end of a stationary rod 211A_1. The movable contact 214A_1 is at an end of a movable rod 212A_1. The stationary rod 211A_1 extends through the housing 215A_1 and is accessible from an exterior of the housing 215A_1. The movable rod 212A_1 also extends through the housing 215A_1 and is accessible from the exterior of the housing 215A_1. In the example shown, the movable rod 212A_1 and the stationary rod 211A_1 extend through opposite sides of the housing 215A_1. However, other implementations and configurations of the vacuum fault interrupter 210A_1 are possible. Moreover, the vacuum fault interrupter 210A_1 may include other components that are known in the art. For example, the bellows may surround the movable operating rod 212A_1, and the vacuum fault interrupter 210A_1 may include end caps.

The stationary contact 213A_1, the stationary rod 211A_1, the movable contact 214A_1, and the movable rod 212A_1 are made of an electrically conductive material such as, for example, brass, copper, silver, or another metallic material. When the stationary contact 213A_1 is in contact with the movable contact 214A_1, the vacuum fault interrupter 210A_1 is in the closed state and electrical current flows through the vacuum interrupter 210A_1 and to the transformer 230A_1. When the stationary contact 213A_1 is separated from the movable contact 214A_1 (such as shown in FIG. 2C), the vacuum fault interrupter 210A_1 is in the open state and current does not flow through the vacuum fault interrupter 210A_1.

The state of the vacuum fault interrupter 210A_1 is controlled by actuating a motion control mechanism 216A_1. The motion control mechanism 216A_1 includes one or more components that are configured to drive the movable operating rod 212A_1. For example, the motion control mechanism 216A_1 may include a motor, gear assembly, shaft, rod, or a combination of such devices. The motion control mechanism 216A_1 also includes a communications interface 218A_1, for example, a transceiver, that communicates with a control system that is separate from the vacuum fault interrupter 210A_1. For example, to change the state of the vacuum fault interrupter 210A_1, an electronic processor of a control system (such as a control system 250_1) issues a command to the communications interface 218A_1 such that one or more components of the motion control mechanism 216A_1 drives the movable operating rod 212A_1 in the Z direction or −Z direction along a linear path 217A_1. The vacuum fault interrupters 210B_1, 210A_2, 210B_2, 210A_3, 210B_3, 210A_4, and 210B_4 may be configured in the same way or similar to the vacuum fault interrupter 210A_1.

Returning to FIG. 2B, the transformer apparatus 240_1 also includes sensors 270A_1 and 270B_1. Each of the sensors 270A_1 and 270B_1 is any type of device configured to measure current through a conductor and to provide an indication of the measured current. The indication of the measured current may be a numerical value that directly represents the measured current or a measured value (for example, a voltage value) from which the current may be derived. Examples of sensors that may be used as the sensor 270A_1 and/or 270B_1 include, without limitation, cored current sensors, coreless current sensors, and a shunt resistor with an isolation analog-to-digital converter (such as a power operational amplifier). Examples of cored current sensors include, without limitation, iron core current transformers (CTs) or air core CTs (that is, a Rogowski coil). A Hall sensor is an example of a coreless current sensor, and other coreless current sensors may be used as the sensor 270A_1 or the sensor 270B_1. Additionally, low-energy analog (LEA) current sensors may be used.

Furthermore, the sensors 270A_1 and/or 270B_1 may be voltage sensors. The voltage sensor is any device configured to measure voltage across a circuit or at a particular point or node relative to ground or another reference potential. For example, when implemented as a voltage sensor, the sensor 270A_1 and/or 270B_1 may be a direct/instrument transformer. An example of a direct/instrument transformer is a potential transformer that converts high or medium voltage (for example, 15 kVac) to lower voltage (for example, 120 Vac). In another example of a voltage sensor, the sensors 270A_1 and 270B_1 may be implemented as an indirect instrument transformer. The indirect instrument transformer provides an indication of measured voltage across a resistive or capacitive element, as amplified by an electronic amplifier. The current is determined by accounting for the size of the resistive or capacitive element and the amount of amplification.

The sensor 270A_1 is positioned to sense the current or voltage in the stationary rod 211A_1 of the vacuum fault interrupter 210A_1. The sensor 270B_1 senses the current or voltage in the stationary rod of the switching apparatus 210B_1. Together, the sensors 270A_1 and 270B_1, the vacuum fault interrupters 210A_1 and 210B_1, and the transformer 230_1 form a circuit 272_1 that operates at the system voltage of the transformer loop 204. The circuit 272_1 is a high-voltage or medium-voltage circuit, depending on the system voltage of the transformer loop 204.

The transformer apparatus 240_1 includes a housing 241_1. The housing 241_1 is a three-dimensional body that encloses a tank 242_1. The tank 242_1 is also a three-dimensional and substantially hollow body that defines an interior space. The components of the circuit 272_1 are within the interior space of the tank 242_1. In addition to containing the various components of the circuit 272_1, the interior space of the tank 242_1 also may be filled with an insulating material or an insulating fluid, such as, for example, oil.

The transformer apparatus 240_1 also includes the control system 250_1. The control system 250_1 controls the state of the vacuum fault interrupters 210A_1 and 210B_1 via the respective motion control mechanisms 216A_1 and 216B_1. The control system 250_1 is also coupled to the sensors 270A_1 and 270B_2. The control system 250_1 may control the state of the switching apparatuses 210A_1 and 210B_1 based on the amount of current flowing in the stationary rod of the vacuum fault interrupters 210A_1 and 210B_1. The control system 250_1 is accessible from an exterior of the tank 242_1. Furthermore, all or a portion of the control system 250_1 may be accessible from the exterior of the housing 241_1.

Figure 2D:
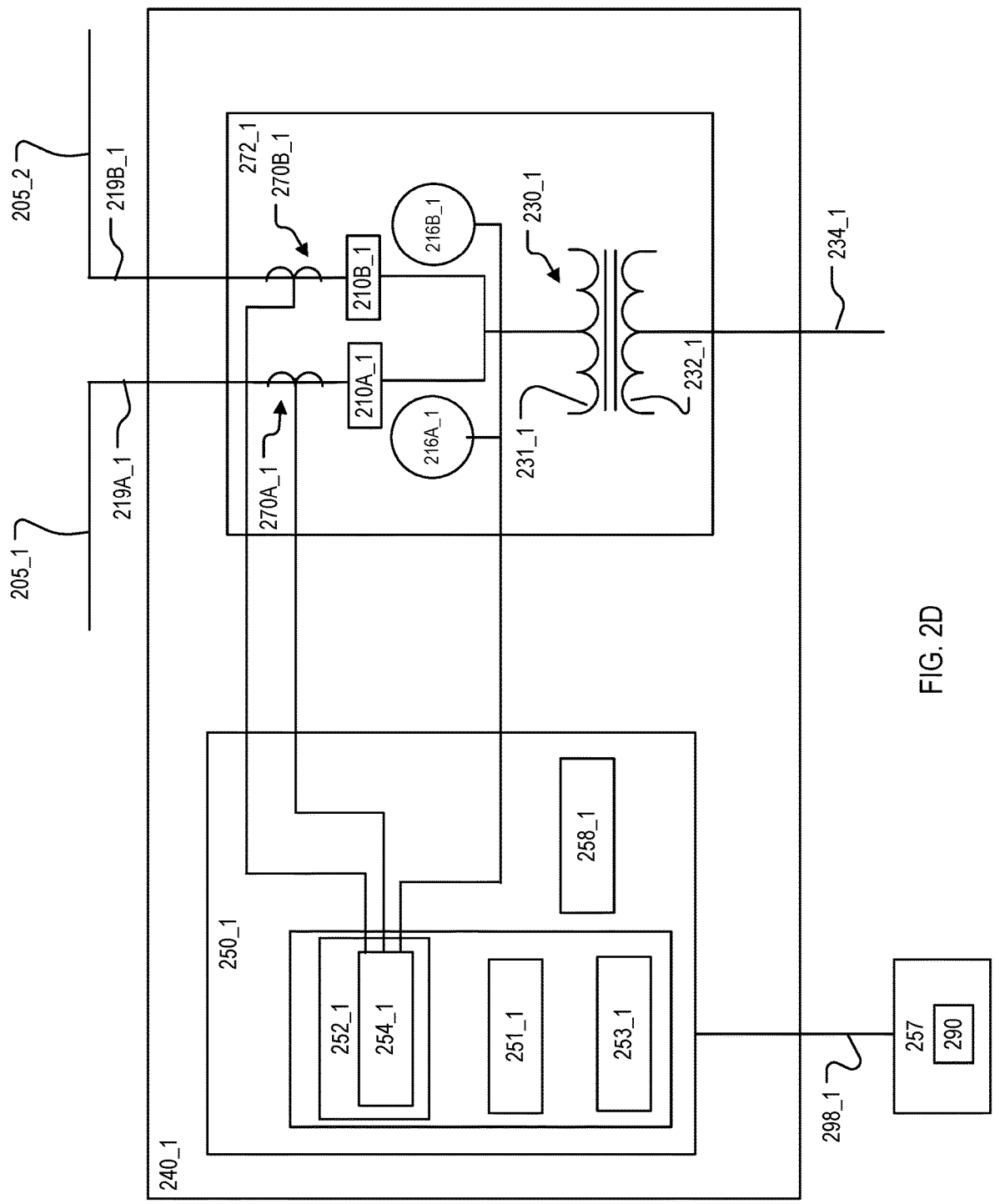
FIG. 2D is a block diagram of an example of a control system.

FIG. 2D is a block diagram that shows the control system 250_1 in more detail. The control system 250_1 includes an electronic processing module 251_1, an electronic storage 252_1, and an input/output (I/O) interface 253_1. In some implementations, the electronic processing module 251_1, the electronic storage 252_1, and the I/O interface 253_1 are implemented as a microcontroller. The electronic processing module 251_1 includes one or more electronic processors. The electronic processors of the module 251_1 may be any type of electronic processor, may be multiple types of processors, and may or may not include a general purpose central processing unit (CPU), a graphics processing unit (GPU), a microcontroller, a field-programmable gate array (FPGA), Complex Programmable Logic Device (CPLD), a digital signal processor (DSP), a microcontroller unit (MCU) and/or an application-specific integrated circuit (ASIC).

The electronic storage 252_1 is any type of electronic memory, machine-readable memory, or computer-readable memory that is capable of storing data and instructions, which may be in the form of computer programs or software, and the electronic storage 252_1 may include multiple types of memory. For example, the electronic storage 252_1 may include volatile and/or non-volatile components. The electronic storage 252_1 and the processing module 251_1 are coupled such that the processing module 251_1 is able to read data from and write data to the electronic storage 252_1.

The electronic storage 252_1 stores data and information related to the operation of the vacuum fault interrupters 210A_1 and 210B_1 in a switch control module 254_1. The switch control module 254_1 may, for example, store one or more fault current limits, a transformer loop over-current limit, and/or a transformer loop over-voltage limit. The switch control module 254_1 also stores executable instructions in the form of a computer program, procedures, or functions that cause the processing module 251_1 to perform actions related to the operation of the vacuum fault interrupter 210A_1 and/or the vacuum fault interrupter 210B_1. For example, the switch control module 254_1 may store instructions that compare an indication from the sensor 270A_1 or the sensor 270B_1 to a pre-defined fault current limit that is stored on the electronic storage 252_1.

The switch control module 254_1 also stores instructions for controlling the state of the vacuum fault interrupters 210A_1 and 210B_1. For example, the switch control module 254_1 may store instructions that cause the electronic processing module 251_1 to issue a command to a motion control device 216A_1 such that the vacuum fault interrupter 210A_1 opens when the current sensed by the sensor 270A_1 exceeds the pre-defined fault current limit. Similarly, the switch control module 254_1 also stores instructions that cause the electronic processing module 251_1 to issue a command to the motion control device 216B_1 that causes the vacuum fault interrupter 210B_1 to open when the current sensed by the sensor 270B_1 exceeds the pre-defined fault current limit. Additionally, the switch control module 254_1 stores instructions that cause the control system 250_1 to command the motion control mechanism 216A_1 or 216B_1 to open or close the respective vacuum fault interrupter 210A_1 or 210B_1 in response to receiving a trigger or other signal from any of the control systems 250_2, 250_3, and 250_4 and/or from a remote device 257. The trigger or other signal may be, for example, an electrical signal that has a voltage that is sufficient to activate the mechanism 216A_1 or 216B_1.

The electronic storage 252_1 also stores information about the configuration of the system 200. For example, during typical and ordinary operation of the system 200, one of the vacuum fault interrupters 210A_1, 210B_1, 210A_2, 210B_2, 210A_3, 210B_3, 210A_4, 210B_4 is configured to be in the open state (or normally open). All of the other vacuum fault interrupters are in the closed state. The electronic storage 252_1 may store information that indicates which vacuum fault interrupter is in the normally open configuration. In some implementations, information about the configuration of the various vacuum fault interrupters and the various transformer apparatuses is provided to the control system 250_1 during operation via the I/O interface 253.

The control system 250_1 also includes the I/O interface 253_1, which is any interface that allows a human operator, an external device, and/or an autonomous process to interact with the control system 250_1. The I/O interface 253_1 allows the control system 250_1 to communicate with components in the transformer apparatus 240_1 and the circuit 272_1. The VO interface 253_1 also allows the control system 250_1 to communicate with other components in the transformer apparatus 240 such as the sensors 270A_1 and 270B_1, and the motion control mechanisms 216A_1 and 216B_1.

The I/O interface 253_1 may include, for example, audio input and/or output (such as speakers and/or a microphone), visual output (such as lights, light emitting diodes (LED)), serial or parallel port, a Universal Serial Bus (USB) connection, and/or any type of network interface, such as, for example, Ethernet. The I/O interface 253_1 also may allow communication without physical contact through, for example, an IEEE 802.11, Bluetooth, cellular, optical, or a near-field communication (NFC) connection. The I/O interface 253_1 also may include a transceiver of any kind. For example, the I/O interface 253_1 may include an optical transceiver, an electronic transceiver, or a combination of such devices. The control system 250_1 may be operated, configured, modified, and/or updated through the I/O interface 253_1.

The I/O interface 253_1 also enables the control system 250_1 to communicate with the remote device 257 via a communication path 298_1. The remote device 257 includes an electronic controller 290, which may include an electronic processor and an electronic storage. The remote device 257 is any type of apparatus, system, or device that is separate from the transformer apparatus 240_1. For example, the remote device 257 may be a control system similar to the control system 250_1 that is in another transformer apparatus. The remote device 257 may be a computer-based work station, a smart phone, tablet, or a laptop computer in a remote monitoring station that connects to the control system 250_1 via a services protocol, or a remote control that connects to the control system 250_1 via a radio-frequency signal or an infrared signal. The I/O interface 253_1 and the remote device 257 may communicate via any type of communication path. For example, the communication path 298_1 may be a physical cable that connects the I/O interface 253_1 and to the remote device 257, or the communication path 298_1 may be a wireless connection that does not utilize a physical cable. In implementations in which the path 298_1 is a physical cable, the cable is any cable suitable for the type of connection on the I/O interface 253_1 and the remote device 257. For example, the cable may be an electrical cable, an Ethernet or other type of network cable, or a fiber optic cable.

The control system 250_1 also includes a power source 258_1. The power source 258_1 provides power to the control system 250_1. The power source 258_1 may be, for example, a battery, a solar cell, or any other type of power source. In some implementations, the control system 250_1 is configured to receive electrical power from a power grid or electrical source that is external to the control system 250_1. In these implementations, the power source 258_1 is a back-up power source that is only used when the external power source is unavailable or operating in a reduced manner.

Returning to FIG. 2A, the transformer apparatuses 240_2, 240_3, and 240_4 are configured in a similar manner as the transformer apparatus 240_1. For example, the transformer apparatuses 240_2, 240_3, 240_4 include respective control systems 250_2, 250_3, 250_4. The control systems 250_1, 250_2, 250_3, 250_4 are coupled to the remote station 257 via respective communication paths 298_1, 298_2, 298_3, 298_4. The communication paths 298_1, 298_2, 298_3, 298_4 are any type of path capable of carrying data and information. For example, the communication paths 298_1, 298_2, 298_3, 298_4 may be any type of wired or wireless connection. Any of the control systems 250_1, 250_2, 250_3, 250_4 is able to communicate with any of the other control systems 250_1, 250_2, 250_3, 250_4 via a data bus 299. The data bus 299 is any type of wired or wireless connection that is capable of carrying data or information.

The configurations shown in FIGS. 2A, 2B, 2C, and 2D are provided as examples, and other implementations are possible. For example, the system 200 may include more than four or fewer than four transformer apparatuses.

FIG. 3 is a flowchart of a process 300. The process 300 is an example of a process for transferring between two sources in a transformer loop or changing the source configuration of the transformer loop. The process 300 is discussed with respect to the system 200 and the transformer loop 204 (FIG. 2A). In the example discussed below, all or part of the process 300 is performed by an electronic processor in the control system 290 of the remote device 257. However, other implementations are possible. For example, all or part of the process 300 may be performed by any one of the control systems 250_1, 250_2, 250_3, or 250_4.

During typical and ordinary operation of the system 200, the transformer loop 204 has one open point. The open point is a vacuum fault interrupter that remains open (or is normally open). The other vacuum fault interrupters are in the closed state. The transformer loop 204 has more than one possible source configuration, and each source configuration is defined by which one of the vacuum fault interrupters 210A_1, 210B_1, 210A_2, 210B_2, 210A_3, 210B_3, 210A_4, 210B_4 is configured to be normally open. The location of the open point determines how the transformers 240_1, 240_2, 240_3, and 240_4 are connected to the sources 202_A and 202_B. For example, if the vacuum fault interrupter 210A_1 is configured to be normally opened, all of the transformer apparatuses 240_1, 240_2, 240_3, and 240_4 are electrically connected to the source 202_B. If the vacuum fault interrupter 210B_2 is configured to be normally opened, the transformer apparatuses 240_1 and 240_2 are electrically connected to the source 202_A and the transformer apparatuses 240_3 and 240_4 are electrically connected to the source 202_B.

Information that defines the various source configurations of the transformer loop 204 may be stored on the control systems 250_1, 250_2, 250_3, 250_4 and/or at the control system 290 on the remote device 257. For example, the lookup table or database may indicate which source each of the transformer apparatuses 240_1, 240_2, 240_3, 240_4 is connected to when a specific one of the vacuum fault interrupters 210A_1, 210B_1, 210A_2, 210B_2, 210A_3, 210B_3, 210A_4, 210B_4 is the normally open point. In some implementations, information about the source configurations is provided by an operator of the system 200.

A command is received to change to a different source configuration of the transformer loop 204 (310). The command may be received at the remote device 257 or via any of the I/O interfaces 253_1, 253_2, 253_3, 253_4. An updated open point of the transformer loop 204 is identified (320). The updated open point is the open point that will provide the source configuration specified by the command. For example, data that identifies which one of the vacuum fault interrupters 210A_1, 210B_1, 210A_2, 210B_2, 210A_3, 210B_3, 210A_4, 210B_4 is to become the open point may be included in the command signal. In some implementations, the command signal specifies which transformer apparatuses 240_1, 240_2, 240_3, 240_4 should be electrically connected to the source 202_A and which should be electrically connected to the source 202_B. In these implementations, the updated open point is determined based on information related to the various possible source configurations that is stored on the remote device 257.

The transformer apparatus that includes the updated open point is identified (330). For example, the remote station 257 may store a look-up table or database that includes data that specifies which vacuum fault interrupters are included in each of the transformer apparatuses 240_1, 240_2, 240_3, 240_4. In these implementations, the transformer apparatus that includes the updated open point is identified from the database or look-up table. In other implementations, the command includes information that indicates which of the transformer apparatuses 240_1, 240_2, 240_3, 240_4 include the updated open point.

The control system of the identified transformer apparatus is controlled such that the vacuum fault interrupter associated with the updated open point is transitioned from the closed state to the open state (340). After the transition from the closed state to the open state is complete, the vacuum fault interrupter associated with the updated open point and the vacuum fault interrupter associated with the open point for the previous source configuration are both in the open state. The transformers between these two open vacuum fault interrupters are disconnected from the transformer loop 204 and temporarily do not receive electrical power from the source 202_A or the source 202_B.

The vacuum fault interrupter associated with the previous open point is closed and the source configuration change is complete (350). To close the previous open point, the control system 290 first identifies the previous open point. The previous open point is the open point of the source configuration that existed when the command in (310) is received. The identity of the previous open point may be stored in an electronic storage and/or provided with the command. For example, in some implementations, the operator or automated process that initiates the command to change the source configuration in (310) also provides the location of the open point in the existing source configuration. In these implementations, the vacuum fault interrupter that is the previous open point is identified from the command itself. In other implementations, the location of the open point at the time of receiving the command in (310) is stored at the remote device 257 or on one or more of the control systems 250_1, 250_2, 250_3, 250_4. In these implementations, the vacuum fault interrupter associated with the previous open point is identified by being retrieved from the electronic storage. After identifying the previous open point, the transformer apparatus that includes the previous open point is identified, and a command is issued to the control system in that transformer apparatus. The command causes the control system to issue a command to close the previous open point.

Two examples of the process 300 are provided below. In a first example, the initial source configuration has the vacuum fault interrupter 210B_3 as normally open, the transformers 240_1, 240_2, 240_3 are electrically connected to the source 202_A, and the transformer 240_4 is electrically connected to the source 202_B. The command is provided to the remote device 257. The command specifies that the source configuration is to change such that the transformer 240_1 is electrically connected to the source 202_A and the transformers 240_2, 240_3, 240_4 are electrically connected to the source 202_B. The remote device 257 determines that the updated open point to achieve the requested source configuration is the vacuum fault interrupter 210A_2. Next, the remote device 257 identifies the transformer 240_2 as including the vacuum fault interrupter 210A_2. The remote device 257 triggers the control system 250_2 to open the vacuum fault interrupter 210A_2. For example, the remote device 257 may send an electrical signal that is sufficient to cause the control system 250_2 to operate in a specified manner. Because the vacuum fault interrupter 210B_3 is already opened, opening the vacuum fault interrupter 210A_2 disconnects the transformers between these two points. In this example, the transformer 230_2 and the transformer 230_3 are disconnected from the transformer loop 204. Although the transformers 230_2 and 230_3 are temporarily disconnected from the transformer loop 204, the total disconnection time is relatively short, for example, about 2.5 s.

The remote device 257 or the control system 250_2 then triggers the control system 250_3 to close the previous open point, which in this example is the vacuum fault interrupter 210B_3. After the vacuum fault interrupter 210B_3 is closed, the transformers 230_2 and 230_3 are again electrically connected to the transformer loop 204 and the source configuration has been changed as requested by the command. Specifically, in this example, after the source configuration is changed as requested, the transformer apparatus 240_1 is electrically connected to the source 202_A and the transformer apparatuses 240_2, 240_3, and 240_4 are electrically connected to the source 202_B. The entire process of changing from one source configuration to another source configuration when the control systems in two different transformer apparatuses are commanded may take about, for example, 5 s.

In a second example, the current source configuration has the vacuum fault interrupter 210A_3 as the open point (that is, the vacuum fault interrupter 210A_3 is configured as normally open), the transformer apparatuses 240_1 and 240_2 are electrically connected to the source 202_A, and the transformer apparatuses 240_3 and 240_4 are electrically connected to the source 202_B. The command specifies that the source configuration is to change such that the transformer apparatuses 240_1, 240_2, 240_3 are electrically connected to the source 202_A, and the transformer apparatus 240_4 is electrically connected to the source 202_B. The remote device 257 determines that the updated open point is the vacuum fault interrupter 210B_3. The remote device 257 determines that the transformer apparatus 240_3 includes the vacuum fault interrupters 210A_3 and 210B_3. The remote device 257 triggers the control system 250_3 to first open the vacuum fault interrupter 210A_3 and to then close the vacuum fault interrupter 210B_3 after the vacuum fault interrupter 210A_3 is in the open state. The source configuration change is complete after the vacuum fault interrupter 210B_3 is closed. After the vacuum fault interrupter 210A_3 is opened and before the vacuum fault interrupter 210B_3 is closed, the transformer 230_3 is disconnected from the transformer loop 204. The disconnection time may be, for example, about 2.5 s and the total time to transfer sources may be, for example, about 5 s.

FIG. 4 is a flow chart of a process 400. The process 400 is an example of a process for isolating a faulted segment of a transformer loop. The process 400 is discussed with respect to the system 200 and the transformer loop 204. The process 400 may be stored as a collection of executable instructions on the control system 250_1, 250_2, 250_3, and/or 250_4, and/or the control system 290.

A fault is detected in a segment of the transformer loop 204 (410). The fault may be caused, for example, by a lightning strike, a malfunction in the transformer loop 204, or an incursion of debris or water into the transformer loop 204 that causes a short circuit. The fault causes a large amount of current to flow in the faulted segment, and the fault may be detected by a sensor that is adjacent to the faulted segment. For example, if the segment 205_2 has a fault, a large amount of current flows in the segment 205_2. The sensor 270B_1 senses the current and provides an indication of the amount of sensed current to the control system 250_1, which compares the indication of the sensed current to a stored threshold current value. If the indication shows that the amount of sensed current is above the threshold current value, a fault is declared in the segment 205_2.

A first switching apparatus adjacent to the faulted segment is opened (420). Continuing with the example above, the control system 250_1 has declared that fault current is flowing in the segment 205_2. The fault current was sensed by the sensor 270B_2, which is associated with the vacuum fault interrupter 210B_1. Thus, the control system 250_1 commands the motion control mechanism 216B_1 to open the vacuum fault interrupter 210B_1. The vacuum fault interrupter 210B_1 may be opened within for example, about 16 milliseconds (ms) plus the time for two cycles of the fundamental frequency of the distribution system 201. For a system operating at a 60 Hz fundamental frequency, it may take about 50 ms after the occurrence of the fault for the vacuum fault interrupter 210B_1 to be opened.

Next, the faulted segment is isolated. As shown in FIG. 2A, the various segments 205_1, 205_2, 205_3, 205_4, 205_5 are between one transformer apparatus and a separate device. Thus, isolating a faulted segment includes triggering a control system in the separate device.

A command is issued to a control system in a separate transformer apparatus (430), and the control system in the separate transformer apparatus opens a second switching apparatus adjacent to the faulted segment (440). Continuing with the example above, after opening the vacuum fault interrupter 210B_1, the control system 250_1 communicates with the control system 250_2. The control system 250_1 provides a signal, information, or command that triggers the control system 250_2 to open the vacuum fault interrupter 210A_2. The faulted segment 205_2 is now isolated. The faulted segment 205_2 may be isolated within, for example, about 66 ms plus two cycles of the fundamental frequency.

For a system with a fundamental frequency of 60 Hz, the faulted segment 205_2 may be isolated in about 98 ms.

During typical and ordinary operation of the transformer loop 204, one of the vacuum fault interrupters is configured as a normally open interrupter. After the faulted segment is isolated, more than one of the vacuum fault interrupters are open and the transformer apparatus or apparatuses between the normally open vacuum fault interrupter and the isolated segment are disconnected from the transformer loop 204. In situations where only one segment in the transformer loop 204 has a fault (such as the example above), closing the normally open vacuum fault interrupter allows electrical power to be restored to all of the transformer apparatuses 240_1, 240_2, 240_3, and 240_4 while the faulted segment remains isolated. Continuing the example above in which the vacuum fault interrupter 210A_3 is normally open, after the faulted segment 205_2 is isolated, the transformer apparatus 240_1 continues to receive electrical power from the source 202_A, and the transformer apparatuses 240_3 and 240_4 receive electrical power from the source 202_B. However, the transformer apparatus 240_2 does not receive electrical power from either the source 202_A or the source 202_B because the vacuum fault interrupters 210A_2 and 210A_3 are open.

The normally opened switching apparatus is closed (450). The control system 250_2 determines which vacuum fault interrupter is the normally open vacuum fault interrupter. For example, the control system 250_2 may determine this from information stored on the control system 250_2. Continuing the above example, the vacuum fault interrupter 210A_3 is identified as the normally open vacuum fault interrupter. The control system 250_2 commands the control system 250_3 to close the vacuum fault interrupter 210A_3. After closing the vacuum fault interrupter 210A_3, the transformer 240_2 is electrically connected to the source 202_B. Each of the transformer apparatuses 240_1, 240_2, 240_3, and 240_4 are connected to one of the sources 202_A and 202_B, and the system 200 is able to continue operation while the faulted segment 205_2 is repaired or replaced. Electrical power may be restored to the transformer 240_2 in about 3 seconds (s), about 2.5 s, or between 2.5 s and 3 s after the initial fault occurred. Accordingly, within a relatively short amount of time after the fault event, the faulted segment 205_2 is isolated and power is restored to all of the transformer apparatuses 240_1, 240_2, 240_3, and 240_4.

In the above example, the control system 250_1 commands the control system 250_2 to open the vacuum fault interrupter 210A_2, and the control system 250_2 commands the control system 250_3 to close the vacuum fault interrupter 210A_3. However, other implementations are possible. For example, the control system 250_1 may command the control system 250_2 to open the vacuum fault interrupter 210A_2, and also may command the control system 250_3 to close the vacuum fault interrupter 210A_3. In other words, any of the control systems 250_1, 250_2, 250_3, 250_4 may command any of the other command systems, and the process 400 may be performed by one of the control systems 250_1, 250_2, 250_3, and 250_4 or by more than one of the control systems 250_1, 250_2, 250_3, 250_4. Moreover, the process 400 may be performed by the control system 290 of the remote device 257. In these implementations, the control system 290 triggers the control systems in the respective transformer apparatuses to control the state of the various vacuum fault interrupters.

Furthermore, the transformer apparatuses 240_1, 240_2, 240_3, and 240_4 are shown and discussed as including vacuum fault interrupters as the switching apparatuses. However, the system 200 may be implemented with other types of switching apparatuses, and the processes 300 and 400 may be performed on systems that include other types of switching apparatuses. For example, in other implementations, the switching apparatuses 210A_1, 210A_2, 210B_1, 210B_2, 210C_1, 210C_2, 210D_1, and 210D_2 may be implemented as any type of trippable and/or openable device that utilizes a mechanical and/or electronic mechanism to separate current-carrying electrical contacts for the purpose of interrupting the flow of electricity, including, for example, circuit breakers, circuit switchers, load-break switches, vacuum breakers, vacuum switches, gas-insulated breakers, contactors, reclosers, or any electronically trippable switching and/or interrupting device. Examples of gas-insulated breakers include but are not limited to sulfur hexafluoride ($SF_6$) insulated breakers and air-insulated breakers. Moreover, the switching apparatuses 210A_1, 210A_2, 210B_1, 210B_2, 210C_1, 210C_2, 210D_1, and 210D_2 may be gang-operated multi-phase devices.

These and other implementations are within the scope of the claims.

What is claimed is:

1. An assembly comprising:
   a housing;
   a first switching apparatus in the housing, the first switching apparatus configured to be electrically connected to a first segment of a transformer loop;
   a second switching apparatus in the housing, the second switching apparatus configured to be electrically connected to a second segment of the transformer loop;
   a transformer in the housing, the transformer comprising:
   a first coil electrically connected to the first switching apparatus and the second switching apparatus; and
   a second coil electrically connected to an output that is configured to electrically connect to a load; and
   an electronic control system in the housing, the electronic control system receiving source configuration information, wherein the source configuration information identifies a normally open point in the transformer loop; and the normally open point is one of the first switching apparatus, the second switching apparatus, and a controllable switching apparatus in another transformer in the transformer loop.

2. The assembly of claim 1, wherein the electronic control system is configured to control a state of the first switching apparatus and a state of the second switching apparatus.

3. The assembly of claim 2, wherein the electronic control system is further configured to:
   issue a command to a second electronic control system in a second assembly, wherein the command is sufficient to cause the second electronic control system to change a state of a switching apparatus in the second assembly; and
   receive a command from the second electronic control system, wherein the received command is sufficient to cause the electronic control system to change a state of the first switching apparatus or the second switching apparatus.

4. The assembly of claim 3, wherein
   the electronic control system and the second electronic control system are configured to communicate with each other.

5. The assembly of claim 4, wherein the electronic control system and the second electronic control system are further configured to communicate with a remote station that is separate from the assembly.

6. The assembly of claim 2, wherein the electronic control system is further configured to control any switching apparatus that is electrically connected to any segment of the transformer loop.

7. The assembly of claim 2, wherein the electronic control system is further configured to communicate with a remote device that is separate from the assembly.

8. The assembly of claim 2, further comprising:
a tank inside the housing, and wherein
the electronic control system comprises an interface that is accessible from an exterior of the housing, the interface being configured to send and receive electronic signals; and the tank encloses the first switching apparatus, the second switching apparatus, and the transformer.

9. The assembly of claim 8, wherein the tank is at least partially filled with an insulating fluid.

10. The assembly of claim 1, further comprising a sensor system configured to sense electrical current in the first segment and electrical current in the second segment.

11. The assembly of claim 10, wherein the sensor system comprises: a first current transformer configured to sense current flowing to the first switching apparatus; and a second current transformer configured to sense current flowing to the second switching apparatus.

12. The assembly of claim 11, wherein the electronic control system stores one or more threshold current values and is coupled to the first switching apparatus, the second switching apparatus, and the sensor system; and
wherein the electronic control system is configured to open the first switching apparatus if the current flowing to the first switching apparatus exceeds at least one of the one or more threshold current values; and to open the second switching apparatus if the current flowing to the second switching apparatus exceeds at least one of the one or more threshold current values.

13. The assembly of claim 1, wherein the assembly is a multi-phase transformer assembly configured for use with an N-phase electrical distribution system, N is an integer number greater than 1, the first switching apparatus is a gang-operated switching apparatus that comprises N switches, and the second switching apparatus is a gang-operated switching apparatus that comprises N switches.

14. The assembly of claim 1, wherein the electronic control system comprises, the electronic control system comprising:
a communications interface configured to send and receive electronic data and configured to be mounted on an exterior surface of the housing;
an electronic processing module; and
an electronic storage coupled to the electronic processing module, the electronic storage comprising instructions that, when executed, cause the electronic processing module to:
process a command received from an external device, the command comprising information that identifies one of two switching apparatuses in the housing transformer to transition from a first state to a second state, wherein the two switching apparatuses comprise the first switching apparatus and the second switching apparatus;
generate a command for an actuation apparatus associated with the identified one of the two switching apparatuses; and
provide the command to the actuation apparatus to thereby change the state of the identified one of the two switching apparatuses.

15. The assembly of claim 14, wherein the external device comprises a separate and distinct transformer assembly, and the instructions cause the electronic processing module to process a command received from the separate and distinct transformer assembly.

16. The assembly of claim 15, wherein the electronic storage further comprises instructions that, when executed, cause the electronic processing module to generate a command and provide the command to a communications interface of a separate and distinct transformer assembly.

17. A method of changing a transformer loop from a first source configuration to a second source configuration, the method comprising:
identifying a first transformer assembly from among a plurality of transformer assemblies in the transformer loop, each of the plurality of transformer assemblies comprising two switching apparatuses such that the transformer loop comprises a plurality of switching apparatuses, the first transformer assembly comprising a first switching apparatus that is normally open in the first source configuration, wherein the first source configuration is defined by the first switching apparatus being normally open and all of the other of the plurality of switching apparatuses being closed;
identifying a second transformer assembly from among the plurality of transformer assemblies in the transformer loop, the second transformer assembly comprising a second switching apparatus that is normally open in the second source configuration, wherein the second source configuration is defined by the second switching apparatus being normally open and all of the other of the plurality of switching apparatuses being closed;
commanding an electronic control system in the second transformer assembly to open the second switching apparatus that is normally open in the second source configuration; and
after the second switching apparatus that is normally open in the second source configuration is open, commanding an electronic control system in the first transformer assembly to close the first switching apparatus that is normally open in the first source configuration such that the source configuration is changed from the first source configuration to the second source configuration.

18. The method of claim 17, wherein the first transformer assembly and the second transformer assembly are different ones of the plurality of transformer assemblies.

19. A method of isolating a faulted transformer loop segment, the method comprising:
receiving an indication of a current flowing to a first switching apparatus and a second switching apparatus of a first transformer assembly, wherein the first switching apparatus is electrically connected to a first segment of the transformer loop and the second switching apparatus is electrically connected to a second segment of the transformer loop;
comparing the indication to a fault current threshold to determine whether the current flowing to the first switching apparatus or the second switching apparatus exceeds the fault current threshold;

if the current flowing to the first switching apparatus exceeds the fault current threshold, commanding a motion control device associated with the first switching apparatus such that the first switching apparatus opens; and isolating the first segment of the transformer loop by commanding an electronic control system in a second transformer assembly to open a third switching apparatus, wherein the third switching apparatus is electrically connected to the first segment of the transformer loop and is in the second transformer assembly.

20. The method of claim 19, further comprising controlling an electronic control system in a third transformer assembly to close a fourth switching apparatus, the fourth switching apparatus being configured to be normally open prior to being closed.

\* \* \* \* \*